Oct. 10, 1967   K. CECH   3,346,222
RESILIENT SUPPORT

Filed June 22, 1965   2 Sheets-Sheet 1

INVENTOR.
KARL CECH
BY McGlew and Toren
ATTORNEYS

Oct. 10, 1967  K. CECH  3,346,222
RESILIENT SUPPORT

Filed June 22, 1965  2 Sheets-Sheet 2

INVENTOR.
KARL CECH
BY McGlew and Toren
ATTORNEYS

United States Patent Office 3,346,222
Patented Oct. 10, 1967

3,346,222
RESILIENT SUPPORT
Karl Cech, Moedling, near Wien, Austria, assignor to Akustische u. Kino-Gerate Gesellschaft m.b.H., Vienna, Austria
Filed June 22, 1965, Ser. No. 466,005
Claims priority, application Austria, July 8, 1964, A 5,873/64
8 Claims. (Cl. 248—24)

ABSTRACT OF THE DISCLOSURE

A plurality of resilient supports, particularly for supporting a rod-like leg of a stand such as for a microphone, are disclosed.

According to the present invention, a resilient support is provided which is formed from a single member made of a resilient material which comprises at least two slender solids of revolution which in the preferred form are arranged with their bases adjacent. A feature of the construction is that each of the embodiments includes a central relatively rigid solid portion which reinforces the overall structure and end portions which are advantageously tapered toward each end which are made sufficiently resilient so that they provide a desirable resilient support particularly for sound devices since the resilient support acts to prevent the transmission of structure-borne noise to the stand which it is designed to support.

A further feature of the construction of the invention is that each of the solids includes a bore which lies on the axis of rotation of the solid and which is arranged opposite to the bore of the adjacent solid forming the opposite end of the member. The construction is such that the member will have a progressively increased spring hardness from the outer end toward the center. The construction is such that vibration of the support is virtually entirely consumed as work for effecting a deformation of the resilient elements and consequently is not transmitted to the stand which is supported by the resilient support device.

Various embodiments of the invention are disclosed, including a construction in which two frusto-conical elements are arranged with their bases adjacent to form an integral member having free ends with bores extending inwardly therefrom and with the bores being spaced apart centrally at the widest portion of the member in order to form a relatively rigid central structure to limit the bending nature. One of the ends is adapted to receive a leg of the stand, and the opposite end is adapted to rest on a support. Various modifications are indicated such as the forming of the member in a cylindrical shape rather than frusto-conical shape. In each embodiment, however, it is preferable that the thickness of the wall increase from the outer end toward the center so that the central portion of the device forms a much more rigid supporting structure than the outer ends. In one embodiment the bore is filled with a sound damping material. In still another embodiment, instead of a bore at one end, the end is formed with one cylinder which is adapted to be pressed into a hollow tubular element of a supporting stand.

In still a further embodiment, the member is formed of more than two solids of revolution, including an upper cylindrical portion having a bore for receiving the stand leg and two frusto-conical portions which extend outwardly from the cylindrical portion and each of which includes a bore defined inwardly from the bottom end thereof.

This invention relates in general to the construction of resilient stand supporting elements and in particular to a new and useful support element for supporting a leg of a sound sensitive device such as a microphone.

It is known that shaking of the support carrying a stand for a microphone will result in noise in the transmission channel. This observation applies to stands resting on the floor as well as to those which rest on a table. In order to avoid this noise, it has been proposed to provide a resilient suspension for the microphone. Such a resilient suspension requires a specially designed, resilient mounting for the microphone so that the installation is rendered appreciably more expensive and in the case of some designs has a relatively large bulk. A highly resilient suspension is mechanically unstable.

For these reasons, the stand, particularly for amateur microphones, has been provided with rubber foot members in order to reduce the noise transmitted from the support. The previous rubber foot members could not be expected to give full success because the leg ends of the stand were merely inserted into a rubber member, which was in most cases ball-shaped. The resilient properties of such a solid member, however, are not sufficient for inhibiting a conduction of structure-borne sound to the stand.

According to the invention, a fully satisfactory effect is achieved if the foot member made in the usual manner from rubber or a similar resilient material comprises a slender solid, preferably a solid of revolution, which has a lower end portion formed with a bore, which preferably extends in the axis of revolution and comprises a slender solid of revolution. The solid member preferably includes an intermediate portion, which is sufficiently rigid to prevent buckling and an upper end portion adapted to be connected to a support leg.

In this specification and the appended claims, the term "slender" as applied to a solid means that the length of this solid exceeds its largest diameter.

In a preferred embodiment of the invention, the intermediate portion which is sufficiently rigid to prevent buckling may comprise a partition, which divides the bores at each end. This partition may have an aperture so that it has the form of an internal flange, which may have a small thickness.

According to another feature of the invention, both bores are made of the same diameter but of different lengths so that different supporting effects can be obtained by simply inverting the foot member in position on the leg. According to the invention, the supporting effects or resilient properties may also be modified if the generatrix of the solid of revolution is a curved line of a plurality of curved lines rather than straight line or lines. The curved lines advantageously comprise a plurality of similar or different curved sections. It may be particularly suitable to use a solid of revolution having a generatrix in the form of a broken line, e.g. a stepped or re-entrant line. Alternatively, the outside peripheral surface of the solid of revolution may be formed with longitudinal grooves.

In a particularly preferred embodiment, the stand leg foot member according to the invention comprises a solid of revolution including two slender conical frustums having coinciding base circles and two cylindrical bores. If the solid of revolution consists of two conical frustums differing in height or wall thickness whereas the two bores have the same diameter, two different spring characteristics may be achieved by simply inverting the foot member in position on the leg. This may be particularly desirable if it is necessary to mount microphones of different weights or, e.g., during stereophonic operation, either one or two microphones on one stand.

The good resilient properties obtained with the stand leg foot member according to the invention are promoted by the design of the usual microphone stands. Such a microphone stand comprises a long central column, which is in most cases tubular and has the legs non-displaceably and pivotally mounted to it at one end of the column. When the stand is erected, these legs include only a relatively small angle with the support, in contrast to stands for photographic purposes, where angles of an order of 60° are desired for stability and absence from vibration.

The invention utilizes the small angle of the legs of microphone stands by the provision of a resilient member which is virtually an extension of the stand leg. This measure alone, however, would not be sufficient to cause the desired result of preventing a transmission of structure-borne noise to the stand. This is only accomplished in that a bore, which lies in the axis of rotation, is provided opposite to the bore serving to receive the stand leg so that the rubber member has a progressive spring hardness. In dependence on the load, the wall of the resulting hollow, resilient member is deformed in its portion bearing on the support and this deformation extends to that point of the wall of gradually increasing thickness where the resilient forces balance the load applied by the stand and the microphone. As the increase in the wall thickness of the solid of revolution at points succeeding in the axial direction is fairly gradual, slight pressure changes will result in large deformations so that the mechanical energy, e.g., of vibrations of the support, is virtually entirely consumed as work for effecting a deformation and consequently is not transmitted to the stand or even to the microphone. Besides, the outer opening of the rubber member may be filled with resilient material having a vibration-damping effect. This material should be softer than the material of the solid of revolution. In this way, relatively hard and relatively soft foot members may be obtained. Such parts may be distinguished by differing in appearance, e.g., a foot may be provided with a relatively hard portion and a relatively soft portion at opposite ends. These portions may be distinguished by different surface configurations.

An object of the invention is to provide a device particularly suitable for supporting a leg of a sound sensitive or vibration sensitive article such as a microphone which is specially constructed to provide for the absorption of vibrations by mechanical deformation without transmitting these vibrations to the support leg.

A further object of the invention is to provide a supporting device which is formed as a solid of elastic material, and which advantageously includes an end portion having a bore extending in from an end face and with the walls of the solid member surrounding the bore increasing in thickness from the end face to provide a resilient support of the varying rigidity.

A further object of the invention is to provide a resilient supporting element particularly adapted for securing to a stand of a device such as a microphone which is formed as a surface of revolution and which may be made of a variety of configurations providing a resilient support of varying rigidity for supporting an element over an elongated contact area.

A further object of the invention is to provide a supporting device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings in which there are illustrated and described preferred embodiments of the invention.

Figure 1:
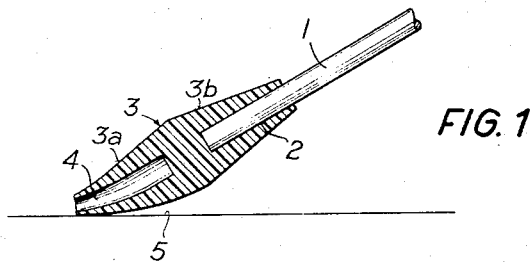
FIG. 1 is a longitudinal sectional view of a supporting device constructed in accordance with the invention secured to a leg of a microphone stand.

As is apparent from FIG. 1, the excellent vibration-damping effect of a supporting device for a sound sensitive device or stand leg foot member generally designated 3, constructed according to the invention is that its elastic supporting qualities vary over its length due to the fact that the wall thickness of that portion of the foot member which bears on the support increases gradually so that a progressive spring hardness results. In the embodiment shown by way of example, the increasing wall thickness is obtained by forming the supporting device 3 as a solid of revolution in the form of two slender conical frustums 3a and 3b having coinciding base circles. At the lower or free end of the device 3 which engages the support 5 there is an inwardly extending cylindrical bore 4. A leg 1 of a stand is inserted in a second cylindrical bore 2 at the upper end of the device 3. The leg 1 is either merely frictionally fitted or adhesively bonded, vulcanized or permanently connected to the device 3. If the supporting device 3 is only frictionally fitted, the two bores 2 and 4 advantageously have the same diameter, as mentioned above. When bores 2 and 4 are made to different lengths, a simple inverting of the foot member in position on the leg can provide resilient properties which are suitable for the applied load.

In any case, the supporting device 3 having an open free end forms a flexible sleeve, which adapts itself closely to the support 5, including any irregularities thereof. The relatively large contact surface extending along the exterior surface results in a high stability and a sufficient protection against slip. For use on a moist support, a rubber composition as is used for automobile tires may be recommendable as a material for the foot member.

The two bores 2 and 4 need not have the same diameter. It may be suitable to use a bore 4 which is larger or smaller in diameter than the bore 2, depending on the load of the foot. It can easily be determined by tests what diameter provides under a given load for an optimum damping of any structure-borne sound transmitted by the support 5.

Figure 2:
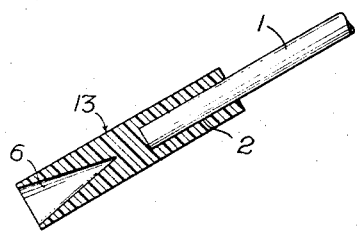
FIG. 2 is a view similar to FIG. 1 of another embodiment of the invention.

In the embodiment of the invention shown in FIG. 2, a supporting device 13 comprises a solid of revolution having a cylindrical form. Just as in the preceding embodiment, the stand leg 1 is inserted into a suitable bore 2'. The increase in wall thickness at the free end of the solid of revolution as required for a progressive spring hardness is obtained in this case in that the cylindrical bore 4 is replaced by a conical bore 6 having its apex directed toward the stand leg 1.

Figure 3:
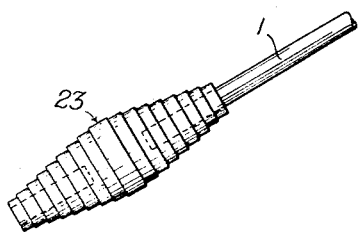
FIGS. 3 and 4 are side elevational views of other embodiments of the invention.

For various reasons, it may be desirable to provide a solid of revolution having a rough surface, e.g., to obtain a specific spring characteristic or gripping action. The rough surface may also be chosen for reasons of appearance or in order to indicate various properties of the solid of revolution constituting the stand leg foot member by its surface configuration. An example of a supporting device 23 having such a surface is shown in FIG. 3, and it includes a stepped design. Other broken lines, curves or curve sections may also form the generatrix for the solid of revolution so that the range of surfaces which may be selected is virtually non-limited.

Figure 4:
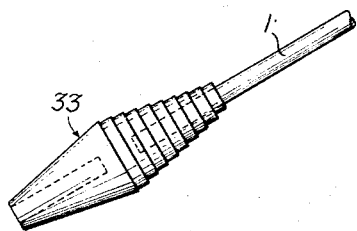

FIG. 4 shows a supporting device 33 having different surface configurations at each end and provides a solid with two halves having different spring characteristics.

Figure 5:
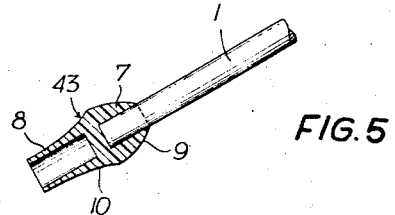
FIGS. 5 and 6 are views similar to FIG. 1 of other embodiments of the invention.

In the embodiment shown in FIG. 5, a supporting device 43 has two bores 7 and 8, which have the same diameter and different lengths so that the spring characteristics of the device can be changed by inserting the stand leg into one or the other of the bores 7 and 8. The device 43 is formed as a solid of revolution comprising two substantially conical frustums 9 and 10 of different height (axial length) and wall thickness. The frustum 9 does not have a perfectly straight side wall but is convexly curved and the second frustum 10 has a concavely curved side wall.

Figure 6:
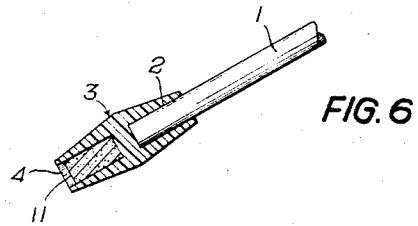

The embodiment of supporting device shown in FIG. 6 by reference numeral 3' differs from that of FIG. 1 in that a plug 11 of shock-absorbing material, which is softer than the material of device 3', fills a major portion of the bore 4.

Figure 7:
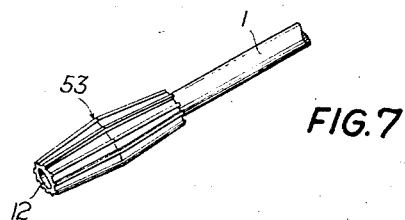
FIG. 7 is a view similar to FIGS. 3 and 4 of another embodiment of the invention.

FIG. 7 shows an embodiment of supporting device 53 which is similar to that of FIG. 1 but in which the device is formed with peripherally spaced, exterior longitudinal grooves 12.

Figure 8:
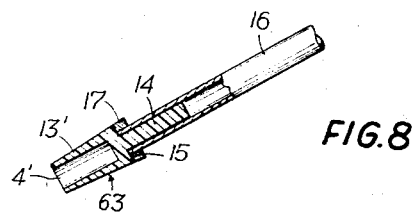
FIG. 8 is a view similar to FIG. 1 of another embodiment of the invention.

FIG. 8 is directed to an embodiment in which the relation between a supporting device 63 and the stand leg 16 is inverted. The device 63 has an outer portion 13' in the form of a frustum of a cone formed with a bore 4' and an inner portion 14 in the form of a cylindrical plug smaller in diameter than the base of the portion 13 so that a shoulder 15 is formed between the portions 13 and 14. This shoulder forms an abutment for the end of the hollow stand 16, which is a close fit on the plug 14. The shoulder 15 is larger in diameter than the outside diameter of the end of the stand leg so that the metal stand cannot directly strike on the support when the foot member is overloaded. To improve the protection against such a direct contact, the portion 13 is continued at its outside periphery beyond the shoulder 15 by a short axially extending flange or cover washer 17, which embraces the extreme lower end portion of the stand leg 16. This flange 17 is optional.

Figure 9:
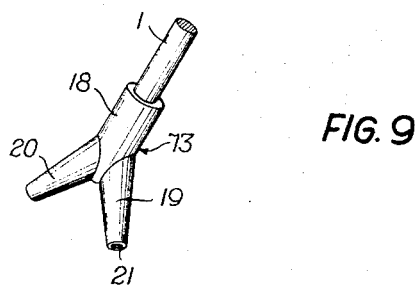
FIG. 9 is a view similar to FIG. 3 of still another embodiment of the invention.

FIG. 9 shows an embodiment which is particularly intended for stands in which the legs are steeper than is usual in microphone stands. In this embodiment, the supporting device 73 consists of an integral member composed of three solids of revolution, namely, a cylindrical upper portion or first end portion 18 having a bore for receiving the stand leg and two inverted frusto-conical portions or second end portions 19, 20 having each a bore 21 lying in the axis of rotation of the respective portion. For a stand having a single, vertical leg ($\alpha=90°$), three frusto-conical portions may be attached to the cylindrical portion 18. The embodiment of FIG. 9 may be particularly suitable for stands for motion picture cameras.

It will be apparent to a person skilled in the art upon reading the foregoing description, that it is essential for the successful use of the foot member that the outer bore is longer than that portion of the generatrix or of the envelope of the generatrix which contacts the support under the heaviest load for which the foot is designed. This fact limits the carrying capacity of the foot.

On the other hand, it is desirable that even when the stand is under the smallest load which is contemplated, the generatrix of the foot member should contact the support at least at two axially spaced apart points so that even weak shocks are not transmitted as pressure shocks but are transformed into work of bending deformation.

While specific embodiments of the invention have been shown and described in detail to illustrate the application of the inventive principles, it will be understood that the invention may be embodied otherwise without departing from such principles.

What is claimed is:

1. A supporting device comprising an integral member having a first end surface and a second opposite end surface, said member having at least two bendable portions each of the shape of a solid of revolution and each tapered outwardly from the center toward each end surface, said member having a bore extending inwardly from said first and second surfaces, the axes of said bores being aligned and the bores being terminated at their axially inner ends by a common portion of said member which is sufficiently rigid to prevent buckling, said member being slender and of a length at least three times the exterior diameter measured at said first and second end surfaces and having a wall thickness increasing from said first end surface towards said common portion.

2. A supporting device comprising an integral member having a first end surface and a second opposite end surface, said member having at least two bendable portions each of the shape of a solid of revolution and one being tapered outwardly from the center toward said first end surface, said member having a bore extending inwardly from said first end surface terminating at its axially inner end by a common solid portion of said member, the portion of said member adjacent said second opposite end surface being formed as a cylinder for insertion into a supporting stand leg, said member being of a length at least three times the exterior diameter measured at said first end surface and having a wall thickness increasing from said first end surface toward said common solid portion, said common solid portion being sufficiently rigid to prevent buckling.

3. A supporting device comprising an integral member of a slender solid of revolution tapered outwardly from the center toward each end and having a first end and a second end, a bore extending inwardly from said first end of said member for securing said first end to a supporting stand leg, said member second end having an end face with a bore extending inwardly therefrom, the axes of said bores being aligned and the bores being terminated at their axially inner ends by a common portion which is sufficiently rigid to prevent buckling, said second end having a wall thickness increasing from said end face toward said first end, said second end portion being formed of a plurality of surfaces of revolution increasing in diameter from said end face.

4. A supporting device comprising an integral member of a slender solid of revolution having a first end and a second end with respective end faces and with a bore extending inwardly from each end face, the axes of said bores being aligned and the bores being terminated at their axially inner ends by a common portion which is sufficiently rigid to prevent buckling, said member having a wall thickness increasing from said first end inwardly toward said common wall portion, and a plug of shock absorbing material in the bore of said first end, said member being slender and of a length at least three times the exterior diameter measured at said first end.

5. A supporting device comprising an integral member of a slender solid of revolution tapered outwardly from the center toward each end and having a first end and a second end, a bore extending inwardly from said first end of said member for securing said first end to a supporting stand leg, said member second end having an end face with a bore extending inwardly therefrom, the axes of said bores being aligned and the bores being terminated at their axially inner ends by a common portion which is sufficiently rigid to prevent buckling, said second end having a wall thickness increasing from said end face toward said first end, the exteriors of said first and second end portions having longitudinally extending grooves defined along the length thereof.

6. A supporting device comprising an integral member having a bendable first end portion of a solid of revolution and a bendable second end portion, said first end portion comprising a solid of revolution and having a free end face with a bore extending inwardly for receiving a supporting stand leg, said second end portion including a plurality of separate stepped surfaces joining said first end portion and extending obliquely outwardly therefrom in distinct directions, each of said end portions having a free end face with a bore defined therein and having a wall thickness surrounding the bores which increases toward said first end portion, the axes of said bores converging axially inwardly and being succeeded at their axially inner ends by a common portion which is sufficiently rigid to prevent buckling.

7. A device for support legs, comprising an integral member of resilient material, said member including at least one lower end portion formed as a solid of revolution with a free lower end face formed with a bore extending inwardly from said end face and located in the axis of revolution, an intermediate portion which is sufficiently rigid to prevent buckling, and an upper end portion adapted to be connected to a support leg, said upper end portion having an open-topped bore for receiving a support leg and said intermediate portion which is sufficiently rigid to prevent buckling comprising a partition at least partly separating said two bores, said upper and lower end portions comprising separate conical frustums having adjacent bases and said bores being cylindrical.

8. A device for support legs comprising a solid of resilient material and formed of at least two slender solids of revolution, each of said solids of revolution having a free lower end face portion formed with a bore extending therein located in the axis of revolution of the respective solid of revolution, the axes of said bores converging axially inwardly and the bores being terminated at their axially inner ends by a common portion which is sufficiently rigid to prevent buckling, said device having an upper end portion adapted to be connected to a support leg.

References Cited

UNITED STATES PATENTS

| | | | |
|---|---|---|---|
| 768,680 | 8/1904 | Norwood | 248—188.9 |
| 1,494,692 | 5/1924 | Lohlker | 248—188.9 X |
| 1,886,112 | 11/1932 | Luarde | 248—188.9 X |
| 1,921,561 | 8/1933 | Christmas | 248—188.9 |
| 2,088,566 | 8/1937 | Avery | 248—24 |
| 2,117,264 | 5/1938 | Workman | 248—358 |
| 2,522,401 | 9/1950 | Rava | 267—1 |
| 2,641,434 | 6/1953 | Henshaw | 248—358 |
| 2,865,133 | 12/1958 | Hoven et al. | 248—188.9 |
| 2,944,367 | 7/1960 | Bontecue | 248—24 X |
| 2,955,795 | 10/1960 | Painter | 248—358 |

FOREIGN PATENTS

| | | |
|---|---|---|
| 578,647 | 6/1959 | Canada. |
| 450,548 | 10/1927 | Germany. |
| 876,471 | 9/1961 | Great Britain. |

JOHN PETO, *Primary Examiner.*